United States Patent [19]

Uozumi

[11] Patent Number: 4,766,817
[45] Date of Patent: Aug. 30, 1988

[54] ELECTRIC POWER SUPPLY SYSTEM FOR RAILWAY TRAIN

[75] Inventor: Yukio Uozumi, Kobe, Japan

[73] Assignee: Transport Systems Engineering Co., Ltd., Tokyo, Japan

[21] Appl. No.: 7,373

[22] Filed: Jan. 27, 1987

[30] Foreign Application Priority Data

Jan. 28, 1986 [JP] Japan .................................. 61-16238
Jan. 28, 1986 [JP] Japan .................................. 61-16239
May 20, 1986 [JP] Japan ................................ 61-115466

[51] Int. Cl.⁴ ............................................ B61L 21/06
[52] U.S. Cl. ................................ 104/299; 246/34 CT
[58] Field of Search ...................... 246/3, 28 R, 34 CT; 104/34, 287, 288, 299, 295, 301 S, 298

[56] References Cited

U.S. PATENT DOCUMENTS

| | | | |
|---|---|---|---|
| 4,118,750 | 10/1978 | Aver et al. ....................... | 246/34 CT |
| 4,304,377 | 12/1981 | Pitard ............................... | 246/34 CT |
| 4,467,430 | 8/1984 | Even et al. ....................... | 246/122 R |
| 4,471,356 | 9/1984 | Gidl ................................. | 246/122 R |
| 4,641,803 | 2/1987 | Brown et al. .................... | 246/34 CT |

FOREIGN PATENT DOCUMENTS

| | | |
|---|---|---|
| 48-49107 | 7/1973 | Japan . |
| 59-23736 | 2/1984 | Japan . |
| 59-32309 | 2/1984 | Japan . |
| 59-32306 | 2/1984 | Japan . |
| 59-32310 | 2/1984 | Japan . |
| 59-175305 | 10/1984 | Japan . |
| 60-71368 | 4/1985 | Japan . |

Primary Examiner—Joseph F. Peters, Jr.
Assistant Examiner—Stephen P. Avila
Attorney, Agent, or Firm—Frishauf, Holtz, Goodman & Woodward

[57] ABSTRACT

A railway system including a track and a train adapted to run on the track. A power feed line comprising a series of feed sections is provided to extend along the track. A plurality of stations are provided along the track and the station has a power supply unit adapted to be selectively connected with one of the feed sections to supply a controlled three-phase AC power to the feed section to thereby operate the train on that feed section in a desired mode. The train has a pair of collecting shoes which are connected with the tracting motor in parallel with each other and arranged with a space in a longitudinal direction of the train. In the station, there is an insulated junction between the two adjacent feed sections which is located so that it is between the two collecting shoes on the train which is stopped in the station at a predetermined position.

8 Claims, 11 Drawing Sheets

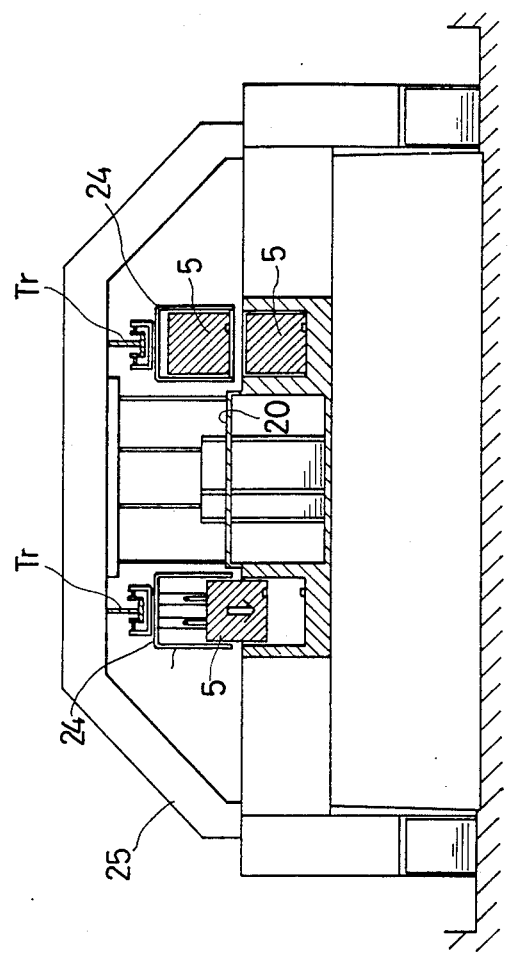

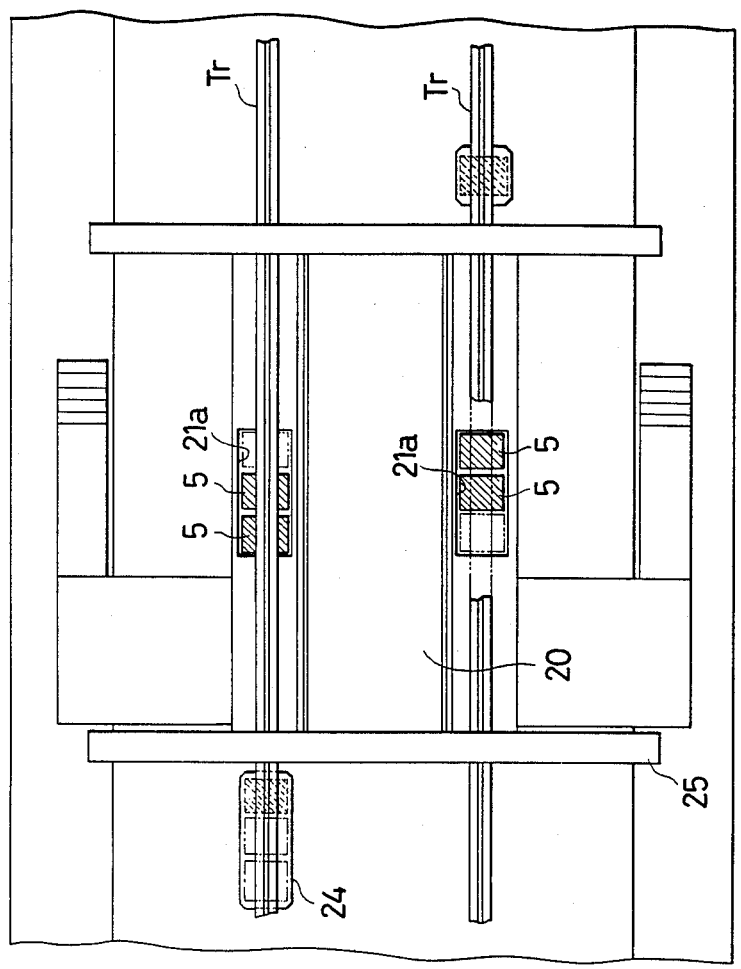

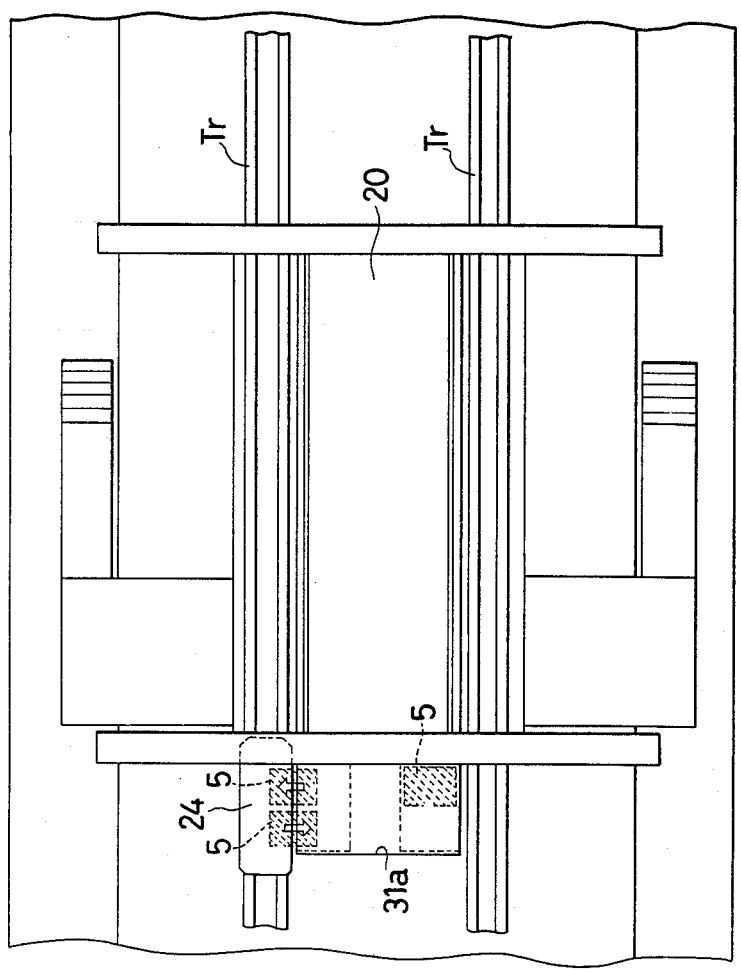

ELECTRIC POWER SUPPLY SYSTEM FOR RAILWAY TRAIN

BACKGROUND OF THE INVENTION

1. Field of the Invention

The present invention relates to a railway train control system, and more particularly to a train thrusting electric current supply system for a railway system. More specifically, the present invention pertains to an electric current supply system having electric power control means provided as a ground facility.

2. Description of the Prior Art

In conventional electrically powered railway systems, electric power is supplied from a feeder wire to a train through collector shoes. The train has one or more motors, and controllers are provided on the train for adjusting the power supply to the motors so that the operation of the train is controlled in accordance with the intention of the train operator. Since the controllers are bulky and heavy, the conventional designs are considered disadvantageous in that the train always carries such bulky and heavy controllers.

In order to eliminate the problems, there is proposed in the Japanese patent application No. 57-131236; filed on July 29, 1982 and disclosed for public inspection on Feb. 7, 1984 under the disclosure number 59-23736 discloses a train system wherein the electric power controllers are provided as a ground facility and a controlled electric power is supplied to the train. According to the proposal, the power feeder line is divided into a plurality of sections each adapted for supplying electric power to a single unit of train. The operator on the train can apply a control signal to the controller provided on the ground and the controller provides a motor driving power which is controlled in accordance with the control signal from the train.

The train system as proposed by the above Japanese patent application is advantageous in that the overall weight of the train can be remarkably decreased. It should however be noted that, in this system, safety security provisions such as control signal lights have to be made as in the conventional systems in order to prevent accidents such as collisions of trains.

Similar train system is also proposed by the Japanese patent application No. 58-181334 filed on Sept. 29, 1983 and disclosed for public inspection on Apr. 23, 1985 under the disclosure number 60-71368. In this system, the ground facility includes an operation command device which provides operation command signals to the controller. The system as proposed by this Japanese patent application is however considered disadvantageous in that each spacing between adjacent two stations constitute a single unit of power feed section so that it is impossible to make two or more trains run in a single spacing between the two adjacent stations. Further, it is required to provide safety security provisions for preventing car collisions.

It may be possible to control the power supply to the power feed sections so that the power supply to one section is interrupted for the purpose of preventing car collisions. It should however be noted that this solution is not recommendable because a train cannot be started until a preceding train leaves the train which is ahead of the first mentioned train so that a longer interval is required between succeeding trains.

Recently, there is an increasing tendency to use three-phase AC motors for traction of railway trains because the AC motors are simple in structure and convenient for maintenance. For controlling operations of the train, at least one of the frequency, the phase and the voltage of the three-phase AC power is regulated. When the train systems of the aforementioned Japanese patent applications are power by AC, special measures have to be taken for the power supply to the train at junctions of the power feeding sections, however, there is no practical solution in the proposed systems.

It should further be noted that in the railway system wherein the controlled power is supplied from the ground equipment to the train, there is a danger that the operation of the whole system is stopped simply by a failure in the ground equipment. However, no solution is given by the aforementioned Japanese patent applications. Back-up systems may be provided for covering the ground equipment under failure. For example, a pair of equivalent equipments may be provided in parallel so that only one is used at a time and the other may be operated when the one equipment fails. However, such back-up systems are usually very expensive because unused facilities must in advance be provided. It may be possible to provide a power supply to a power feed section in case of a failure in the ground facility from another ground facility which is adjacent to the failed ground facility. However, in order to make such back-up possible, the ground facilities must be of large capacities so that an increased investment is required.

SUMMARY OF THE INVENTION

It is therefore an object of the present invention to provide an electrically powered train system in which safety securing signals devices can be omitted without any danger of car collision.

Another object of the present invention is to provide a railway train control system of a type having controllers provided on the ground but not on the trains so that a controlled power is supplied from the controllers to the trains, in which two or more trains can be operated in a single space between two adjacent stations so that trains are operated in an increased density.

A further object of the present invention is to provide a power supply system for railway trains which has power control equipments provided on the ground so that each power control equipment supplies a controlled power to one train but it can cover a plurality of power supply sections so that it can be used as a back-up for another equipment when necessary.

Still further object of the present invention is to provide a power supply system for railway trains, which has power control equipments provided on the ground but can prevent failure of the whole system in case of a failure in one control equipment.

According to the present invention, the above and other objects can be accomplished by a railway system including track means, a train, said track means being provided with power feeding means extending along said track means for supplying a three-phase AC power to said train, sensing means provided along said track means for detecting said train, said train being provided with motor means for traction of the train and at least two collecting means for collecting electric power from said power feeding means, said two collecting means being connected with said motor means in parallel with each other and located on the train with a spacing in a longitudinal direction of the train, train stop stations provided along said track means, said power feeding means having separated feed sections which are longitudinally aligned with each other and located along said track means with an insulated junction between each two adjacent feed sections, one of said junctions being positioned in each of said stations so that it is located between the two collecting means on the train when the train is stopped at a predetermined location in the station, at least one of said junctions being located between said stations, electric power supplying means provided in at least one of said stations, said electric power supplying means including controlling means for providing a three-phase AC power of at least a desired frequency, switching means for selectively connecting said controlling means with one of the feed sections and logic means for controlling said controlling means and said switch means in accordance with an external command which represents a desired operation of the train and a detection signal from the sensing means.

According to one aspect of the present invention, each of said stations is provided with at least one electric power supply means so that each electric power supply means covers the feed sections in one space between two adjacent stations. According to another aspect of the present invention, two electric power supply means are provided in every adjacent two stations so that the electric power supply means can cover a plurality of interstation spaces whereby one electric power supply means can be used as a back-up to another electric power supply means in case of a failure of the said another electric power supply means.

The above and other objects and features of the present invention will become apparent from the following descriptions of preferred embodiments taking reference to the accompanying drawings.

BRIEF DESCRIPTION OF THE DRAWINGS

FIG. 9 is a vertical sectional view of the station showing another procedure of changing the electric power supply unit;

FIG. 10 is a plan view of the station shown in FIG. 9; and

FIG. 11 is a plan view of the station showing a further procedure of changing the electric power supply unit.

DESCRIPTION OF THE PREFERRED EMBODIMENT

Figure 1:
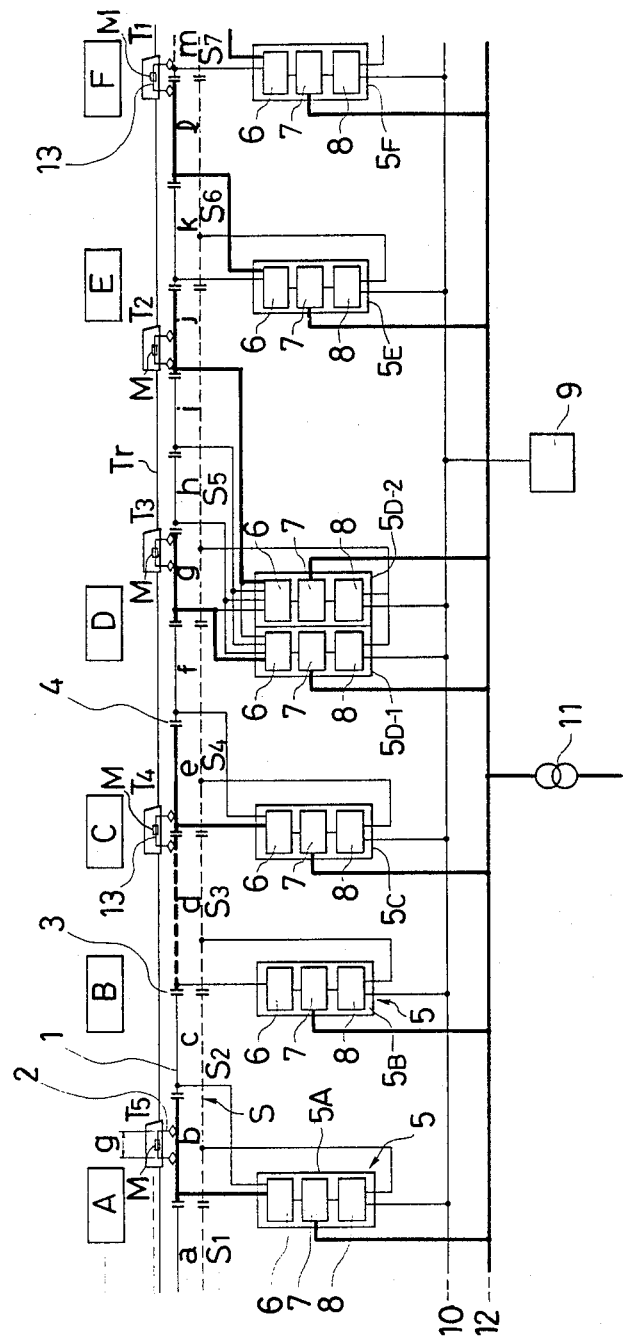
FIG. 1 is a plan view of a railway power supply system in accordance with one embodiment of the present invention.

Referring to the drawings, particularly to FIG. 1, there is shown a railway system including a railway track Tr along which trains $T_1$, $T_2$, $T_3$, $T_4$ and $T_5$ are passed. The railway system further includes train stop stations A, B, C, D, E and F provided along the track Tr. Trains have electric motors M for producing tractive force. Appropriate circuit protectors may be provided in the trains as in conventional railway systems.

In order to provide a supply of electric power to the motors M on the trains, there is a power feed line 1 extending along the railway track Tr. As shown, the power feed line 1 is divided into a plurality of feed sections $1a$, $1b$, $1c$, $1d$, $1e$, $1f$, $1g$, $1h$, $1i$, $1j$, $1k$, $1l$ and $1m$. The length of the power feed section is determined so that it is greater than the braking distance of the train. Between each two adjacent feed sections, there is an electrically insulated junction 3. In each station, there is provided at least one electric power supply unit 5. In FIG. 1, the stations A, B and C are provided with units 5A, 5B and 5C, respectively. The station D is provided with two units 5D-1 and 5D-2. The stations E and F are provided with units 5E and 5F, respectively.

Each of the electric power supply units 5 is constituted by a switching circuit 6, a controlling circuit 7 and a logic circuit 8. The controlling circuit 7 is connected with an electric power line 12 so that the circuit 7 receives an electric power supply from the power line 12. The switching circuit 6 functions to connect the output of the controlling circuit 7 with selected one of the feed sections. More specifically, the switching circuit 6 in the unit 5A functions to connect the output of the controlling circuit 7 in the same unit alternately with the feed section $1b$ or $1c$. The switching circuit 6 in the unit 5B selectively connects the output of the controlling circuit 7 in the same unit with the feed section $1d$. The circuit 6 in the unit 5C alternately connects the output of the circuit 7 in the same unit with the feed section $1e$ or $1f$. The units 5D-1 and 5D-2 are arranged so that they cover the feed sections $1g$, $1h$, $1i$ and $1j$. The unit 5E is arranged to cover the feed sections $1k$ and $1l$.

Figure 3:
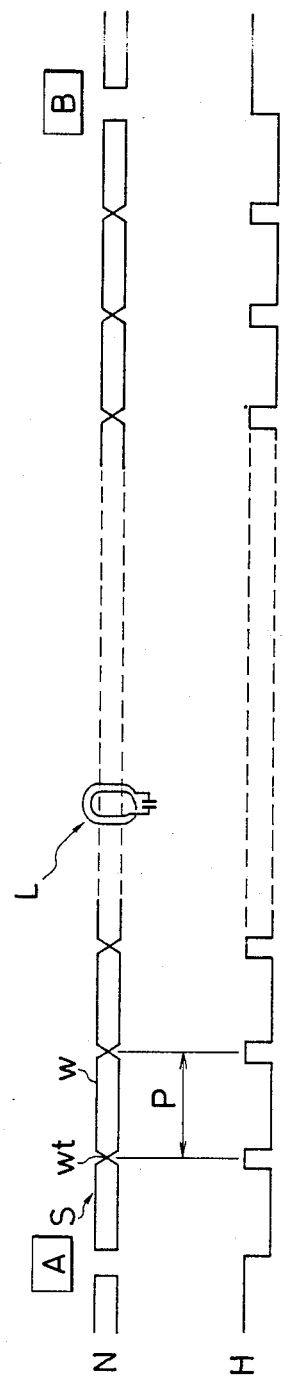
FIG. 3 is a diagrammatical view showing an example of the train sensor.

The logic circuit 8 is connected with a command line 10 for receiving a command signal from a command station 9. The circuit 8 is further connected with a train sensor S to receive a train signal therefrom. As shown in FIG. 3, the train sensor S includes a loop of electrically conductive wire w which is twisted at regularly spaced positions as shown by wt. The loop of wire w extends along the track between each adjacent two stations, such as the stations A and B as shown in FIG. 3 and connected with the logic circuit 8 which supplies to the loop an AC current of a predetermined frequency $F_1$. The train carries a resonance coil L having a resonating frequency $F_2$ so that pulses H are produced as the coil L passes by the twist wt of the wire loop w. The number of the pulses is counted to identify the location of the train and the intervals of the pulses are detected to identify the speed of the train. In FIG. 1, it will be noted that one train sensor S is provided between each two adjacent stations so that these train sensors are identified by the references S1, S2, S3, S4, S5, S6 and S7.

The logic circuit 8 has a local program of train speed control in the area which the corresponding electric power supply unit covers. The command station 9 gives a command of revision of the local program when such revision is necessary. The logic circuit 8 produces a control signal based on the local program and the train location signal from the train sensor S as well as the command signal from the command station, if any. The control signal from the logic circuit 8 is applied to the controlling circuit 7 which produces a three-phase AC output of which voltage and frequency are determined in accordance with the signal from the logic circuit 8. The signal of the logic circuit 8 is also applied to the switching circuit 6 so that the feed sections where the trains are being operated and the feed sections which are ahead of the feed sections having trains on them are supplied with the controlled three-phase AC power.

In order to pick up the controlled three-phase AC power in the feed line 1, the train is provided with at least two power collecting shoes 2 which are connected with the motor M in parallel. The collecting shoes 2 are located on the train with a longitudinal spacing g. The location of the insulative junction 3 in each station is such that the junction 3 is inbetween the collecting shoes 2 on the train which is stopped at a predetermined position in the station.

In the situation shown in FIG. 1, the train $T_1$ is just to stop at the station F so that the switching circuit 6 of the unit 5E is operated to connect the controlling unit 7 to the feed section 1l. The controlling circuit 7 of the unit 5E is producing a three-phase AC power which is suitable for the braking of the train $T_1$. The feed section 1m which is ahead of the feed section 1l is disconnected from the unit 5F so that no electric power is supplied to the feed section 1m.

The train $T_2$ is just moved from the feed section 1i to the feed section 1j and this train $T_2$ is started to be braked. The unit 5D-2 is therefore connected with the feed section 1j to supply an appropriately controlled three-phase AC power to the feed section 1j. The train $T_3$ has left the station D and the acceleration has almost been finished on the feed section 1g. The unit 5D-1 in the station D is therefore connected with the feed section 1g to supply an appropriately controlled power to the train $T_3$.

The train $T_4$ is in the station C and just leaving the station. Thus, the unit 5C in the station 1C is connected with the feed section 1e to supply this feed section with an accelerating AC power whereas the unit 5B in the station B is disconnected from the feed section 1d. The train $T_5$ is on the feed section 1b so that the unit 5A in the station A is connected with the feed section 1b to supply this feed section with an accelerating AC power.

Figure 2:
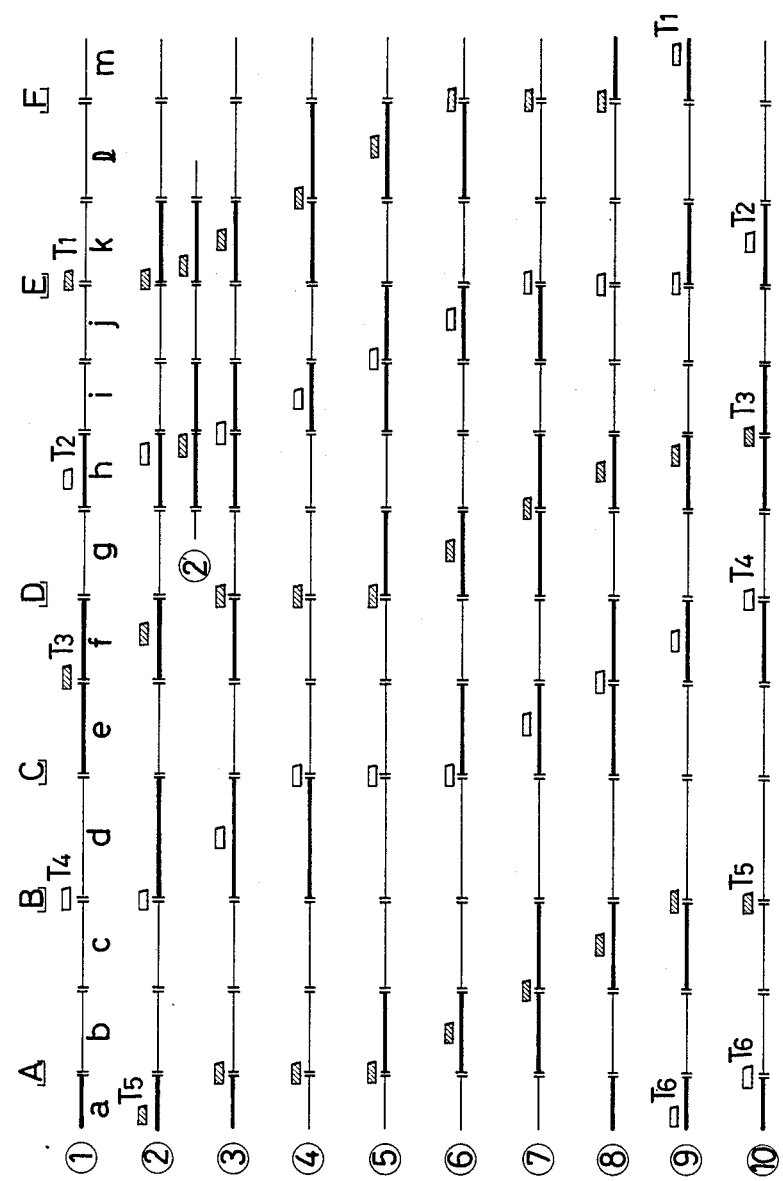
FIG. 2 is a diagram showing one example of the control in the embodiment shown in FIG. 1.

Referring to FIG. 2, there is shown sequential controls of the operations of the trains. As regards the train $T_1$, it is stopped in the station E in the timing (1) so that the unit 5E is disconnected from either of the feed sections 1j and 1k. In the timing (2), the train $T_1$ is started to be accelerated so that the feed section 1k is energized by being connected with the unit 5E. The controlling circuit 7 in the unit 5E then provides a controlled power for the acceleration of the train $T_1$ in the timings (2') and (3). In the timing (4), the train $T_1$ is on the junction 3 between the feed sections 1k and 1l whereby the collecting shoes 2 are respectively in contact with the feed sections 1k and 1l. Before the train comes to the junction 3, the feed section 1l which is ahead of the feed section 1k is energinzed by the power supply unit 5F in the station F. This function is shown in the timing (2') with respect to the train $T_2$. As the train $T_2$ approaches the junction 3 between the feed sections 1h and 1i, the feed section 1i which is ahead of the feed section 1h is energized as shown in the timing (2'). Thereafter, the train $T_2$ goes into the junction 3 between the feed sections 1h and 1i.

In the timing (5), the train $T_1$ approaches the station F so that the brake is applied to the train $T_1$. For the purpose, the controlling circuit 7 in the unit 5F produces an AC power which is appropriately regulated for the braking. The train $T_1$ is then stopped at the station F in the timing (6) since the feed section 1m which is ahead of the feed section 1l is disconnected from the power supply unit 5F. In the timing (7), both the feed sections 1l and 1m are disconnected from the power supply unit 5F so that the train $T_1$ is kept stationary in the station F. Thereafter, the feed section 1m is energized as shown in the timings (8) and (9) for the start of the train $T_1$ in the station F. The operations of the other trains are substantially the same as the operation of the train $T_1$ so that no further descriptions will be made.

It will be noted in FIG. 2 that there is at least one feed section which is disconnected from the power supply unit succeeding to the feed section on which the train is being operated. This is advantageous in avoiding train collision in that even when the preceding train has stopped on one feed section by an accident, the succeeding train will be stopped in the deenergized feed section through application of the emergency brake as soon as the succeeding train enters the deenergized feed section.

It will be noted in FIG. 2 that in the station, only one of the collecting shoes on the train is in contact with the energized feed section. Usually, this will cause an unstable train operation because the one collecting shoe may by accident be detached from the energized feed section. However, in the starting period, the train operation is relatively smooth so that there is substantially no possibility of the collecting shoe being detached from the energized feed section. The invention is based on the recognition of this fact and provides an insulative junction of the feed sections in the station so that the aforementioned control can be made.

In the aforementioned embodiment, the train sensor S is provided in each interstation space. However, in case where two or more trains are operated in one interstation space, there must be provided a plurality of train sensors in a single interstation space.

Figure 4:
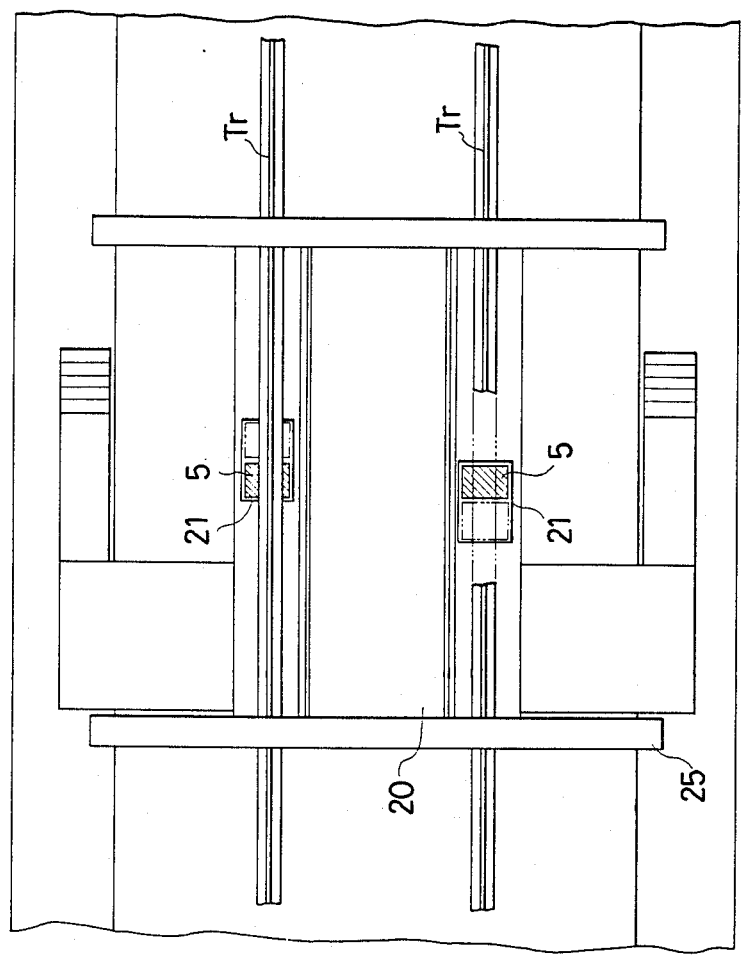
FIG. 4 is a plan view showing one example of the train stop station.
Figure 5:
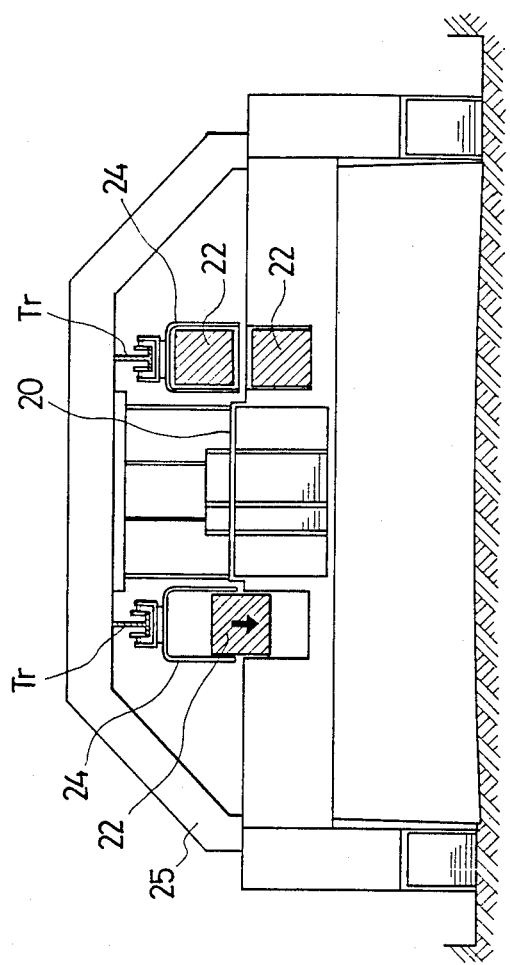
FIG. 5 is a vertical sectional view of the station.

Referring now to FIGS. 4 and 5, there is shown a station structure 25 which is formed with a platform 20 between a pair of tracks T. Beneath the tracks T there recesses 21 for positioning the electric power supply unit 5. The recess 21 is large enough to accommodate for two power supply units 5 and only one power supply unit 5 is positioned in each recess 21 as shown by a solid line in FIG. 4. In case where the unit in the recess 21 is replaced by another unit, the new power supply unit 21 is brought in the recess 21 as shown by broken line in FIG. 4. Then, the previously positioned unit is taken out of the recess 21.

FIG. 5 shows the procedure for changing the power supply unit 5. The illustrated railway system is of a type in which the train cars are suspended from the track T. There is provided a specially designed train for carrying the power supply unit 5 for substituting the unit 5 which is in the recess 21. The train includes a car 24 for carrying a power supply unit 5. The train is moved to the station and stopped at a position where the power supply unit 5 carried by the car 24 is positioned above the recess 21. Then, the unit 5 carried by the car 24 is lowered into the recess 21 and the power supply unit 5 which has previously been in the recess 21 is taken out of the recess 21.

Figure 6:
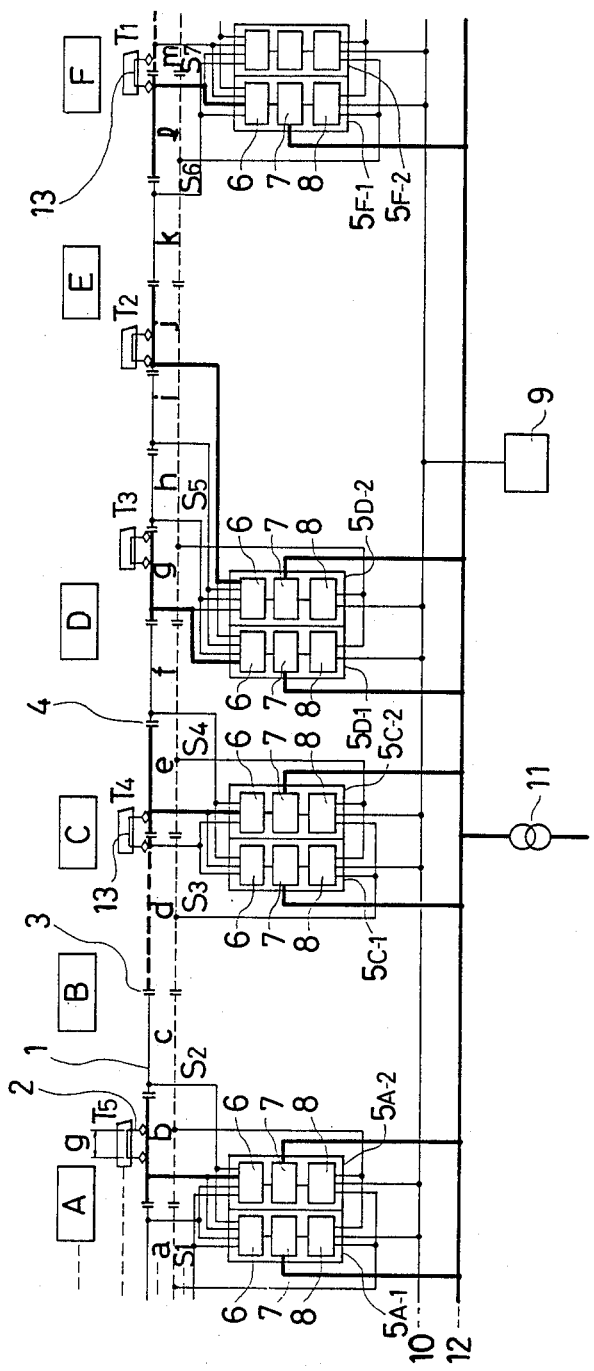
FIG. 6 is a plan view similar to FIG. 1 but showing another embodiment.

Referring now to FIG. 6, the embodiment shown therein is different from the previous embodiment in that one for every two stations is provided with two power supply units 5. In principle, alternate stations are provided with such power supply units 5. However, in case where it is required to operate two trains in one interstation space, two adjacent stations may be provided with the power supply units 5. In the example shown in FIG. 6, the stations A, C, D and F are provided with two power supply units 5.

The units 5A-1 and 5A-2 in the station A are connected with the feed sections 1a, 1b and 1c to selectively supply the electric power to these feed sections. The units 5C-1 and 5C-2 in the station C are connected so that they can cover the feed sections 1d, 1e and 1f. The station D is adjacent to the station C but it is provided with power supply units 5D-1 and 5D-2 because it is required to operate two trains T2 and T3 between the stations D and E. The units 5D-1 and 5D-2 in the station D cover the feed sections 1g, 1h, 1i and 1j. The units 5F-1 and 5F-2 in the station F are connected with the feed sections 1k, 1l and 1m. In operation, the units 5A-1 and 5A-2 in the station A are appropriately switched to supply the power to the feed sections 1a, 1b and 1c so that two trains can be operated in these feed sections. Similarly, the units 5C-1 and 5C-2 in the station C are switched so that two trains can be operated in the feed sections 1d, 1e and 1f which cover the interstation spaces between the stations B and C and between the stations C and D. The units 5D-1 and 5D-2 in the station D are switched so that two trains are operated between the stations D and E. In the arrangements shown in FIG. 6, a failure of one unit 5 in one station can be covered by the other unit in the same station. For example, when the unit 5D-1 becomes inoperative, the unit 5D-2 covers the feed sections 1g, 1h, 1i and 1j. In this case, however, only one train can be operated between the stations D and E. It may of course be possible to provide a provisional power supply unit in each station where the two power supply units are provided for use during a failure of one of the units.

Figure 7:
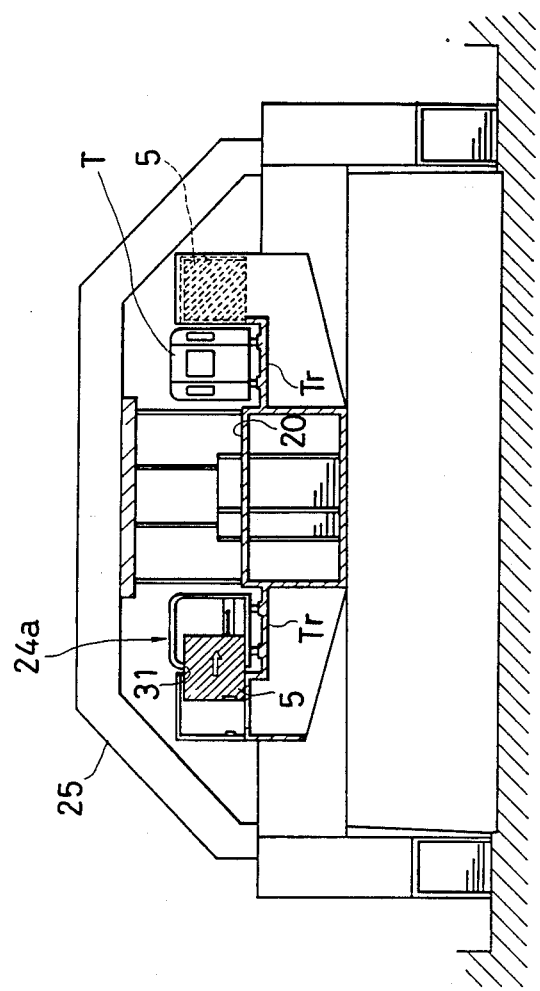
FIG. 7 is a vertical sectional view of the station showing the procedure of changing the electric power supply unit.
Figure 8:
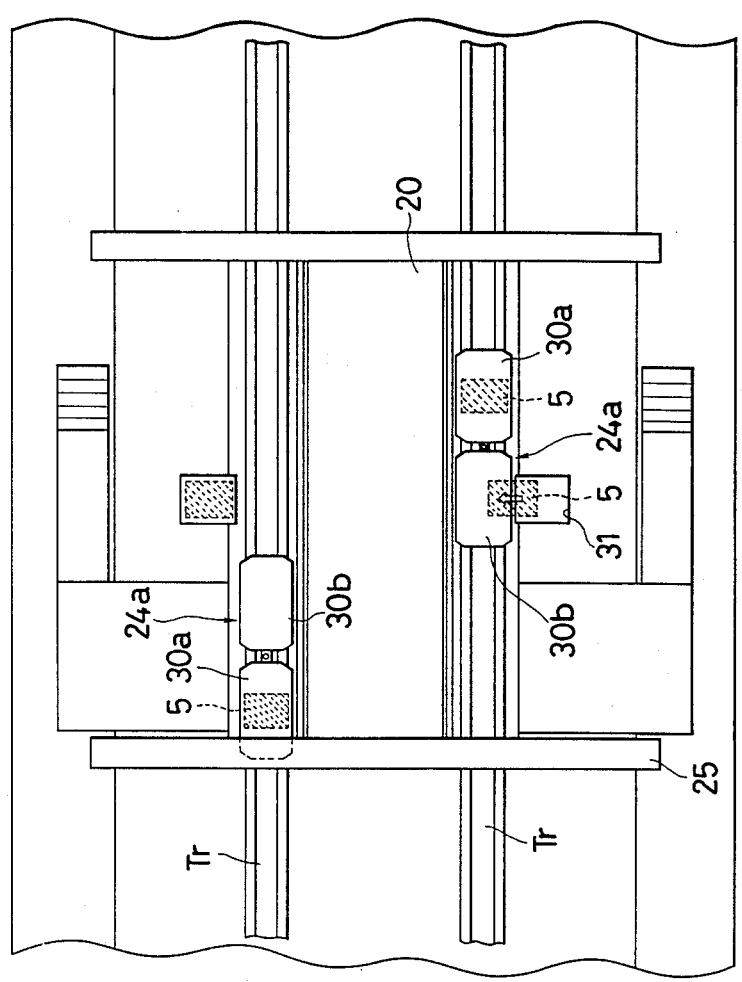
FIG. 8 is a plan view of the station shown in FIG. 7.

Referring now to FIGS. 7 and 8, there is shown another way of changing the power supply unit in the station. The railway system shown therein is of a conventional type wherein the train T runs on a railway track Tr. A platform 20 is provided between a pair of tracks Tr. The power supply unit 5 is located at a side of the track Tr opposite to the platform 20. There may be provided a power supply unit carrying train 24a which may be constituted by two cars 30a and 30b, each having a sideward opening 31 as shown in FIG. 7. The car 30a may be vacant and the car 30b may be loaded with one power supply unit 5 as shown in FIG. 8. The train 24a is stopped at first in the station at a position where the unloaded car 30a is at a side of the unit loading position. Then, the unit 5 in the station is moved into the vacant 30a and the train is moved to the position where the loaded car 30b is at a side of the unit loading position. Thereafter, the unit 5 on the car 30b is moved to the unit loading position in the station.

In FIGS. 9 and 10, there is shown another way of changing the power supply unit 5. The system shown therein is substantially the same as that shown in FIG. 5 so that the descriptions on FIG. 5 may be referred to. As shown in FIG. 10, the station is formed beneath each track Tr with a recess 21a which is large enough to accommodate for three power supply units. In the recess 21a, there are two power supply units 5 for the embodiment shown in FIG. 6 and a provisional space is left in the recess for another unit. The train 24 for carrying the power supply units 5 to that station is constituted as in the embodiment of FIG. 5.

Referring to FIG. 11, there is shown a further procedure for changing the electric power supply unit 5. In this example, the space 31a for positioning the units 5 is provided at a longitudinal end of the platform 20 between the pair of tracks Tr. The unit 5 is taken out of the space 31a and brought into the space 31a sidewardly as in the embodiment of FIGS. 7 and 8. In this embodiment, however, the space 31a receives the units 5 from each side of the space.

The invention has been shown and described with reference to specific embodiments, however, it should be noted that the invention is in no way limited to the details of the illustrated arrangements but changes and modifications may be made without departing from the scope of the appended claims.

I claim:

1. A railway system including track means, a train of railway cars, said track means being provided with power feeding means extending along said track means for supplying a three-phase AC power to said train, sensing means provided along said track means for detecting said train, said train being provided with motor means for traction of the train and at least two collecting means for collecting electric power from said power feeding means, said two collecting means being parallel with each other and connected with said motor means and located on the train with a spacing in a longitudinal direction of the train, train stop stations provided along said track means, said power feeding means having separated feed sections which are longitudinally aligned with each other and located along said track means with an insulated junction between each two adjacent feed sections, one of said junctions being positioned in each of said stations so that it is located between the two collecting means on the train when the train is stopped at a predetermined location in the station, at least one of said junctions being located between said stations, electric power supplying means provided in at least one of said stations, said electric power supplying means including controlling means for providing a three-phase AC power of at least a desired frequency, switching means for selectively connecting said controlling means with one of the feed sections and logic means for controlling said controlling means and said switch means in accordance with an external command which represents a desired operation of the train and a detection signal from the sensing means.

2. A railway system in accordance with claim 1 in which said electric power supply means is provided in each of the stations.

3. A railway system in accordance with claim 1 in which at least two electric power supply means are provided in one of two adjacent stations.

4. A railway system in accordance with claim 1 in which two electric power supply means are provided in each alternate station.

5. A railway system in accordance with claim 1 in which the at least one of said stations having the electric power supply means provided therein is formed with recess means beneath the track means for accommodating said electric power supply means so that the electric power supply means can be brought into the recess means from the train on said track means.

6. A railway system in accordance with claim 5 in which said recess means has an extra space for receiving a further electric power supply means.

7. A railway system in accordance with claim 1 in which the at least one of said stations having the electric power supply means provided therein is formed with a space at a side of the track means for accommodating said electric power supply means so that the electric power supply means can be brought into the space sidewardly from a train on said track means.

8. A railway system in accordance with claim 1 in which at least four feed sections are provided between two adjacent stations, one of said two stations being provided with two electric power supply means which are selectively connected with said feed sections between the two stations so that two trains can be operated between the two adjacent stations.

* * * * *